US008265596B2

(12) United States Patent
Shin

(10) Patent No.: US 8,265,596 B2
(45) Date of Patent: Sep. 11, 2012

(54) MOBILE TERMINAL AND METHOD FOR PROTECTING PERSONAL INFORMATION THEREOF

(75) Inventor: Hyun Seok Shin, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 444 days.

(21) Appl. No.: 12/466,028

(22) Filed: May 14, 2009

(65) Prior Publication Data

US 2009/0311991 A1 Dec. 17, 2009

(30) Foreign Application Priority Data

Jun. 16, 2008 (KR) .................. 10-2008-0056367

(51) Int. Cl.
*H04M 1/66* (2006.01)
*H04M 3/16* (2006.01)
*H04B 1/38* (2006.01)

(52) U.S. Cl. .................. 455/410; 455/566; 455/411
(58) Field of Classification Search .................. 455/410, 455/411, 565, 566
See application file for complete search history.

(56) References Cited

U.S. PATENT DOCUMENTS

| 6,201,540 B1* | 3/2001 | Gallup et al. ................ 715/764 |
| 7,248,867 B2* | 7/2007 | Strawn ............................ 455/423 |
| 7,304,570 B2* | 12/2007 | Thomas et al. ........... 340/539.11 |
| 7,420,546 B2* | 9/2008 | Abdallah et al. ............... 345/173 |
| 7,738,857 B2* | 6/2010 | Engstrom et al. ............. 455/411 |
| 7,965,873 B2* | 6/2011 | Goto ............................. 382/115 |
| 2003/0051138 A1* | 3/2003 | Maeda et al. .................. 713/168 |
| 2005/0075092 A1* | 4/2005 | Kim ............................. 455/411 |
| 2006/0112274 A1* | 5/2006 | Lee ................................ 713/171 |
| 2006/0234764 A1* | 10/2006 | Gamo et al. ............... 455/552.1 |
| 2006/0281448 A1* | 12/2006 | Plestid et al. ................. 455/418 |
| 2007/0232270 A1* | 10/2007 | Ohkubo et al. ............... 455/411 |
| 2007/0271528 A1* | 11/2007 | Park et al. ..................... 715/810 |
| 2008/0125093 A1* | 5/2008 | Ullah ............................ 455/411 |
| 2008/0259036 A1* | 10/2008 | Mixdorf ........................ 345/168 |
| 2008/0280645 A1* | 11/2008 | Hawkins et al. ........... 455/556.2 |

FOREIGN PATENT DOCUMENTS

| KR | 10-2006-0061640 A | 6/2006 |
| KR | 10-0664148 B1 | 12/2006 |
| KR | 10-2007-0062636 A | 6/2007 |
| KR | 10-2007-0071389 A | 7/2007 |

\* cited by examiner

*Primary Examiner* — Christopher M Brandt
(74) *Attorney, Agent, or Firm* — Jefferson IP Law, LLP

(57) ABSTRACT

A mobile terminal and personal information protection method thereof using a protection function shortcut key are provided. The personal information protection method determines, when at least one key is input, whether the key is substantially identical with one of a plurality of protection function shortcut keys, displays, when the input key is substantially identical with a protection function shortcut key, a protection function setting menu having at least one item of personal information, sets, when at least one item of personal information is selected, the protection function in association with the selected personal information, and enables the protection function on the selected personal information. Therefore, the personal information protected by the protection function is not displayed on a display unit of the mobile terminal.

21 Claims, 14 Drawing Sheets

FIG. 5A

```
PROTECTION
FUNCTION SETTING
☐  1. PHONEBOOK
☑  2. MESSAGE
☑  3. COMMUNICATION LOG
☐  4. PHOTO/VIDEO
☐  5. SCHEDULE
☐  6. SUPPLEMENTARY SERVICE
* PROTECTION FUNCTION
  SHORTCUT KEY DELETE
# INTEGRATED PROTECTION
FUNCTION SHORTCUT KEY SETTING
```

FIG. 5B

```
PROTECTION FUNCTION
SHORTCUT KEY DELETE

DELETE?

[ YES ]      [ NO ]
```

FIG. 5E

| | PHONEBOOK |
|---|---|
| ☐ | FAMILY |
| ☑ | CLUB |
| ☑ | BUSINESS |
| ☐ | FRIEND |
| | ⋮ |

FIG. 5F

| | MESSAGE |
|---|---|
| ☑ | MIN JEONG KIM |
| ☑ | CHEOL SOO KIM |
| ☐ | SO JEONG LEE |
| ☐ | YEONG SOO LEE |
| | ⋮ |

```
┌─────────────────────────────────┐
│           MESSAGE               │
├─────────────────────────────────┤
│  ☐  CHEOL SOO KIM-HOW ARE       │
│  ☑  YEONG SOO LEE-GET LOAN      │
│  ☐  SO JEONG LEE WHAT' RE YA DOIN?│
│  ☑  CHEOL SOO KIM THANKS        │
│  ☐  MIN JEONG KIM - HI^^        │
│  ☐  CHEOL SOO KIM - GOOD MORNIN │
│              •                  │
│              •                  │
│              •                  │
└─────────────────────────────────┘
```

FIG. 5I

SCHEDULE

MAY, 2008

| M | T | W | T | F | S | S |
|---|---|---|---|---|---|---|
|   |   |   |   | 1 | 2 | 3 |
| 4 | 5 | 6 | 7 | 8 | 9 | 10 |
| 11 | 12 | 13 | 14 | ✓ | 16 | 17 |
| 18 | 19 | ✓ | 21 | 22 | 23 | 24 |
| 25 | 26 | 27 | 28 | 29 | 30 |   |

FIG. 5J

| PROTECTION FUNCTION | |
|---|---|
| 1 | PROTECTION FUNCTION ENABLE |
| 2 | PROTECTION FUNCTION DISABLE |
| 3 | PROTECTION FUNCTION RESET |

MOBILE TERMINAL AND METHOD FOR PROTECTING PERSONAL INFORMATION THEREOF

PRIORITY

This application claims the benefit under 35 U.S.C. §119 (a) of a Korean patent application filed in the Korean Intellectual Property Office on Jun. 16, 2008 and assigned Serial No. 10-2008-0056367, the entire disclosure of which is hereby incorporated by reference.

BACKGROUND OF THE INVENTION

1. Field of the Invention

The present invention relates to a mobile terminal. More particularly, the present invention relates to a mobile terminal having a protection function shortcut key and a personal information protection method thereof using the protection function shortcut key.

2. Description of the Related Art

In order to improve the convenience of voice and data communication functions, mobile terminals support storing of personal information such as a phonebook, messages, communication logs, photos, motion pictures, schedules, memos, etc. The personal information stored in a mobile terminal can be easily accessed and manipulated. Accordingly, the personal information is likely to be exposed undesirably and thus a personal information protection function has become an essential function of mobile terminal.

A conventional method for protecting the personal information of a mobile terminal is a lock function using a password. Once the mobile terminal is locked with a password, the mobile terminal can be used by entering the password registered by the mobile terminal owner, thereby preventing another person from accessing the personal information, resulting in information leakage protection.

Recently, as a $3^{rd}$ Generation (3G) mobile terminal operating with Universal Subscriber Identity Module (USIM) is becoming dominant, the mobile terminal is likely to be used by several users. When using a borrowed mobile terminal, the borrower cannot use the mobile terminal's functions that are locked by the owner. In case that the owner has released the lock of functions before letting a borrower use the mobile terminal, the owner's personal information can be exposed to the borrower. For example, when the owner has locked a messaging function of the mobile terminal, the borrower cannot access messages stored in the borrowed mobile terminal. If the lock of the messaging function is released by the owner, the borrower can access the messages stored in the borrowed mobile terminal. Accordingly, in order to avoid an undesired access to the messages when the mobile terminal with functions unlocked is used by others, the owner should delete all private activities and personal information.

In a conventional lock function, only one password can be registered with the mobile terminal such that when the password is compromised, all the information under protection with the password can be invaded.

Also, the conventional lock function is explicit whether the function is locked or not and uses at most a 4 digit password which is vulnerable to be hacked. Accordingly, there has been a need to develop an information protection method that is capable of protecting the personal information stored in the mobile terminal without using an explicit lock function.

SUMMARY OF THE INVENTION

An aspect of the present invention is to address at least the above-mentioned problems and/or disadvantages described below. Accordingly, an aspect of the present invention is to provide a personal information protection method for a mobile terminal that is capable of improving personal information protection efficiency of the mobile terminal by hiding whether the lock function is enabled.

Also, another aspect of the present invention is to provide a personal information protection method for a mobile terminal that is capable of preventing the owner's personal information stored in the mobile terminal from being exposed to a borrower without deleting the information.

Also, still another aspect of the present invention is to provide a personal information protection method for a mobile terminal that is capable of preventing the personal information stored in the mobile terminal from being eavesdropped.

In accordance with an aspect of the present invention, a personal information protection method for a mobile terminal is provided. The method includes determining, when at least one key is input, whether the key is substantially identical with one of preregistered protection function shortcut keys, displaying, when the input key is substantially identical with a protection function shortcut key, a protection function setting menu having at least one item of personal information, setting, when at least one item of personal information is selected, the protection function in association with the selected personal information, and enabling the protection function on the selected personal information, the personal information protected by the protection function not being displayed on a display unit of the mobile terminal.

In an exemplary implementation, the registering of the protection function shortcut keys includes displaying, when a protection function shortcut key registration menu is selected, a protection function shortcut key input window, and registering, when a protection function shortcut key is input in the protection function shortcut key input window, the protection function shortcut key. In another exemplary implementation, the registering of the protection function shortcut keys further includes displaying a password input window before displaying the protection function shortcut key input window, determining, when a password is input in the password input window, whether the input password is substantially identical with a preregistered password, and displaying, when the input password is substantially identical with the preregistered password, the protection function shortcut key input window.

In accordance with another aspect of the present invention, a personal information protection method of a mobile terminal is provided. The method includes determining, when at least one key is input, whether the input key is substantially identical with one of protection function shortcut keys associated with a protection function, and activating, when the input key is substantially identical with a protection function shortcut key, the protection function. When the protection function is activated, personal information protected with the protection function shortcut key is not displayed on a display of the mobile terminal.

In an exemplary implementation, the setting of the protection function of the protection function shortcut key includes displaying, when a protection function shortcut key registration menu is selected, a protection function shortcut key input window, displaying, when a protection function shortcut key is input in the protection function shortcut key input window, a protection function setting menu having at least one item of personal information, and setting, when at least one item of personal information is selected from the protection function setting menu, the protection function on personal information corresponding to the selected item. In another exemplary implementation, the setting of the protection function of the protection function shortcut key further includes displaying a password input window before displaying the protection function shortcut key input window, determining, when a password is input in the password input window, whether the input password is substantially identical with a preregistered password, and displaying, when the input password is substantially identical with the preregistered password, the protection function shortcut key input window.

In accordance with yet another aspect of the present invention, a mobile terminal supporting a personal information protection function is provided. The terminal includes a display unit for displaying personal information stored in the mobile terminal, a storage unit for storing the personal information and protection function shortcut keys for executing the personal information protection function, and a control unit for registering the protection function shortcut keys and for executing the personal information protection function, wherein, when the personal information protection function is activated, the personal information protected using the protection function shortcut keys are not displayed on the display unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 5A is a diagram illustrating an exemplary protection function setting menu screen according to an exemplary embodiment of the present invention;

FIG. 5B is a diagram illustrating an exemplary protection function shortcut key delete menu screen displayed when a protection function key delete menu item is selected according to an exemplary embodiment of the present invention;

FIG. 5E is a diagram illustrating another exemplary phonebook screen displayed when a phonebook item is selected on the protection function setting menu according to an exemplary embodiment of the present invention;

FIG. 5F is a diagram illustrating an exemplary message list screen displayed when a message item is selected according to an exemplary embodiment of the present invention;

FIG. 5I is a diagram illustrating an exemplary calendar screen displayed when a schedule item is selected according to an exemplary embodiment of the present invention;

FIG. 5J is a diagram illustrating an exemplary protection function option screen providing protection function enable, protection function disable, and protection function reset options according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1:
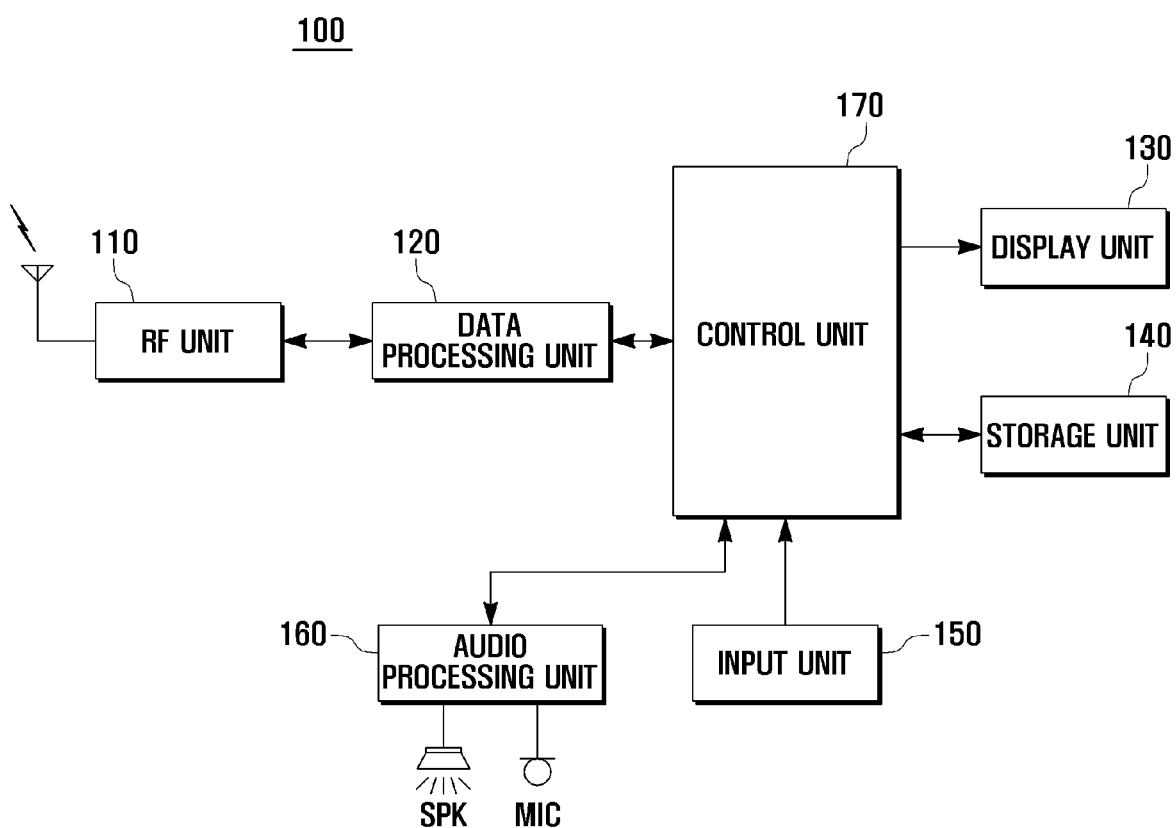
FIG. 1 is a block diagram illustrating a configuration of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In exemplary embodiments of the present invention, "protection function shortcut key" is a shortcut key configured to set and execute the protection function. In exemplary embodiments, when the protection function shortcut key is input, a protection function setting menu is displayed or the protection function is executed. In exemplary embodiments of the present invention, the protection function shortcut key can be implemented with a numeral character string, an alphabet character string, or a string of combination of numeral and alphabet characters. In exemplary embodiments of the present invention, one or more protection function shortcut keys can be configured, and the protection function shortcut keys can be applied for different protection functions.

In exemplary embodiments of the present invention, the "protection function setting menu" is a menu for setting the protection function to the protection function shortcut key. The "protection function setting menu" includes the items representing the personal information that can be protected with the protection function. In exemplary embodiments of the present invention, the "protection function setting menu" may include a protection function shortcut key deletion function and integrated protection function shortcut key deletion function. FIG. 5A illustrates a protection function setting menu screen according to an exemplary embodiment of the present invention. In FIG. 5A, the protection function setting menu includes items of protectable personal information including a phone book, messages, photos, motion pictures, schedules, etc. and information on the sub-menu keys such as protection function shortcut key deletion and integrated protection function shortcut key deletion.

Figure 3A:
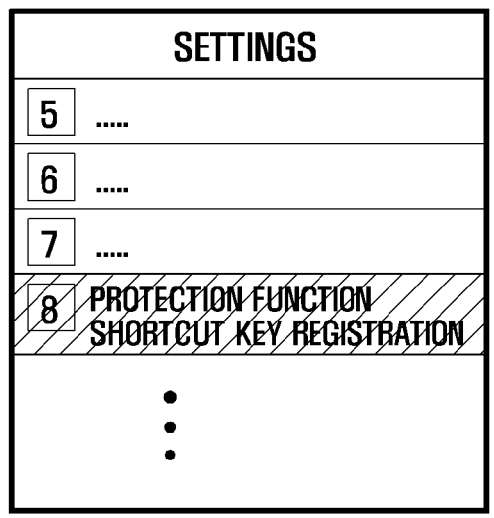
FIG. 3A is a diagram illustrating an exemplary setting menu screen, according to an exemplary embodiment of the present invention, on which a protection function shortcut key registration menu item is selected.
Figure 3B:
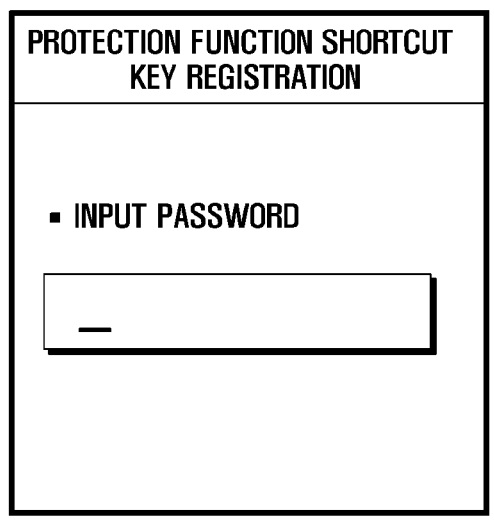
FIG. 3B is a diagram illustrating a protection function shortcut key registration menu screen providing an exemplary password input window.

In exemplary embodiments of the present invention, "protection function short key registration menu" can be provided as one of general menu items or a submenu item of the general menu of the mobile terminal for registering the protection function shortcut key. FIG. 3A illustrates a screen of a setting menu having the "protection function shortcut key registration menu" as a submenu item. In an exemplary embodiment of the present invention, when the "protection function shortcut key registration" item is selected, a password input window appears as illustrated in FIG. 3B and then, if a password is entered, a protection function shortcut key input window appears to register a protection function shortcut key.

FIG. 1 is a block diagram illustrating a configuration of a mobile terminal according to an exemplary embodiment of the present invention.

Referring to FIG. 1, the mobile terminal 100 includes a Radio Frequency (RF) unit 110, a data processing unit 120, a display unit 130, a storage unit 140, an input unit 150, an audio processing unit 160, and a control unit 170.

The RF unit 110 includes an RF transmitter (not shown) for up-converting and amplifying a transmission signal frequency and an RF receiver (not shown) for low noise amplifying and down-converting a received signal frequency. The data processing unit 120 encodes and modulates the transmission signal, and demodulates and decodes the received signal.

The display unit 130 can be implemented with a Liquid Crystal Display (LCD) and displays various visual information and operation status of the mobile terminal 100. According to an exemplary embodiment of the present invention, the display unit 130 performs a function of displaying personal information stored in the mobile terminal 100, a protection function setting menu, a password input window, and a protection function shortcut key input window, but not the personal information that is protected by the personal information protection function when it is enabled under the control of the control unit 170.

The storage unit 140 stores application programs and data associated with the mobile terminal 100. According to an exemplary embodiment of the present invention, the storage unit 140 stores personal information including the phonebook, messages, passwords, protection function shortcut keys, etc.

The input unit 150 is provided with a plurality of alphanumeric keys for inputting alphanumeric information and function keys for setting and executing various functions of the mobile terminal 100. According to an exemplary embodiment of the present invention, the input unit 150 includes keys for selecting personal information items, inputting a password, and a protection function shortcut key.

The audio processing unit 170 includes a microphone MIC and a speaker SPK and processes audio signals.

The control unit 170 controls general operations of the mobile terminal. According to an exemplary embodiment of the present invention, the control unit 170 can control the input unit 150 to detect at least one key input and determine whether the key input is a pre-registered protection function shortcut key. According to an exemplary embodiment of the present invention, the control unit 170 controls such that the display unit 130 does not display the personal information registered with the protection function while the protection function runs.

Figure 2:
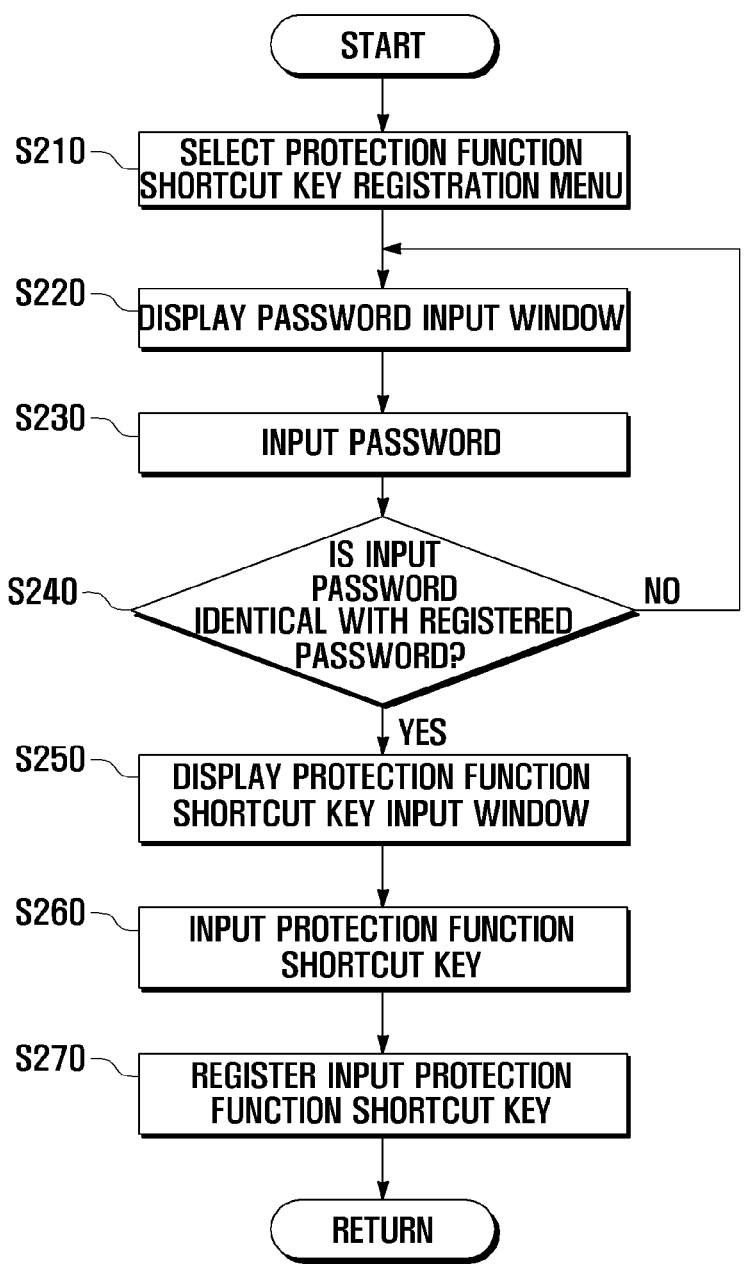
FIG. 2 is a flowchart illustrating a protection function shortcut key registration procedure of a personal information protection method for a mobile terminal according to an exemplary embodiment of the present invention.

FIG. 2 is a flowchart illustrating a protection function shortcut key registration procedure of a personal information protection method for a mobile terminal according to an exemplary embodiment of the present invention.

Figure 3C:
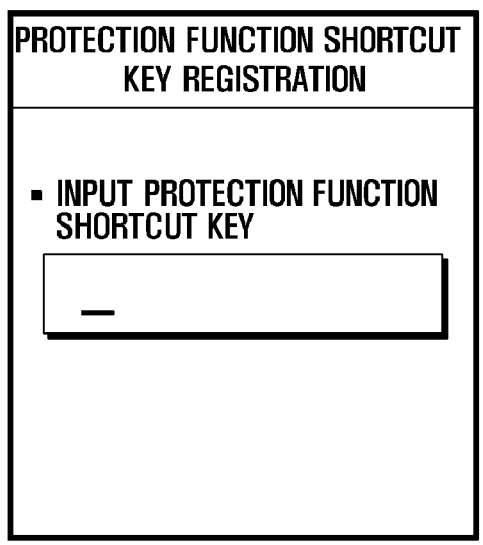
FIG. 3C is a diagram illustrating a protection function shortcut key registration menu screen providing an exemplary protection function shortcut key input window.

Referring to FIG. 2, when detecting the selection of the protection function shortcut key registration menu at step S210, the control unit 170 controls such that the display unit 130 displays a password input window at step S220. FIG. 3A is a diagram illustrating an exemplary setting menu screen, according to an exemplary embodiment of the present invention, on which a protection function shortcut key registration menu item is selected, and FIG. 3B is a diagram illustrating a protection function shortcut key registration menu screen providing an exemplary password input window. The control unit 170 checks a character string input through the password input window at step S230 and determines whether the input character string is substantially identical with the registered password at step S240. If it has been determined that the character string is substantially identical with the registered password, the control unit 170 controls such that the display unit 130 displays a protection function shortcut key input window at step S250. FIG. 3C is a diagram illustrating a protection function shortcut key registration menu screen providing an exemplary protection function shortcut key input window. Next, the control unit 170 verifies a protection function shortcut key input through the protection function shortcut key input window at step S260 and, if valid, registers the protection function shortcut key with the storage unit 140 at step S270. According to an exemplary embodiment, the protection function shortcut key can be one of a numeral character string, an alphabet character string, and a string of combination of numeral and alphabet characters. If it has been determined that the input character string is not substantially identical with the registered password, the control unit 170 controls such that the display unit 130 returns to step S220 to display the password input window.

Figure 4:
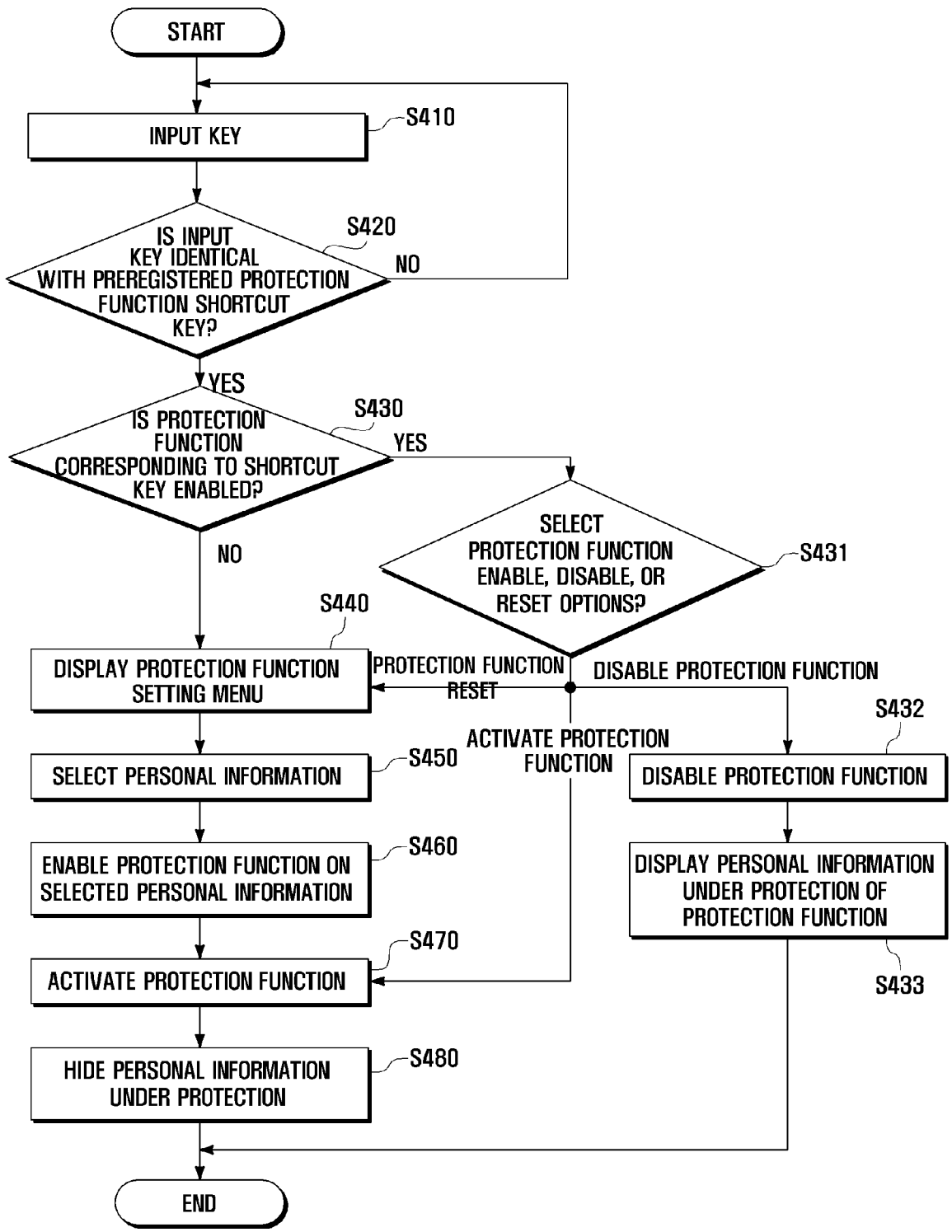
FIG. 4 is a flowchart illustrating a protection function setting and execution procedure of a personal information protection method for a mobile terminal according to an exemplary embodiment of the present invention.

FIG. 4 is a flowchart illustrating a protection function setting and execution procedure of a personal information protection method for a mobile terminal according to an exemplary embodiment of the present invention.

Referring to FIG. 4, the control unit 170 first detects at least one key input at step S410 and determines whether the detected key is one of registered protection function shortcut key at step S420. If it has been determined that the detected key is a registered protection function shortcut key, the control unit 170 determines whether the detected protection function shortcut key is enabled at step S430. If it has been determined that the detected protection function key is disabled, the control unit 170 controls such that the display unit 130 displays the protection function setting menu at step S440.

FIG. 5A is a diagram illustrating an exemplary protection function setting menu screen according to an exemplary embodiment of the present invention. The protection function setting menu includes at least one personal information item such as a phonebook, messages, communication logs, photos, videos, schedules, supplementary services, etc. The supplementary services may include a wireless Internet access service, a mobile transaction service, and the like. According to an exemplary embodiment, the protection function setting menu may further include at least one of a protection function shortcut key delete menu item and an integrated protection function shortcut key setting menu item for enabling all the registered protection function shortcut keys at a time.

FIG. 5B is a diagram illustrating an exemplary protection function shortcut key delete menu screen which is displayed with "YES" and "NO" buttons when the protection function key delete menu item is selected. If the "YES" button has been selected, the control unit 170 disables the protection function short key(s) selected on the protection function setting menu screen.

Figure 5C:
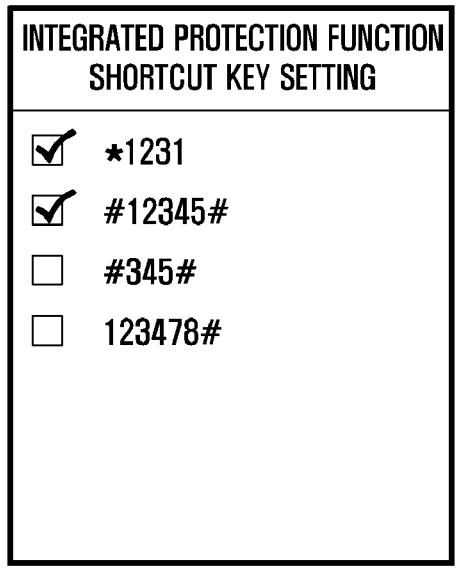
FIG. 5C is a diagram illustrating an exemplary integrated protection function shortcut key setting menu screen displayed when an integrated protection function shortcut key menu item is selected according to an exemplary embodiment of the present invention.

FIG. 5C is a diagram illustrating an exemplary integrated protection function shortcut key setting menu screen displayed when the integrated protection function shortcut key menu item is selected on the protection function menu. Through the integrated protection function shortcut key setting menus screen, the user can select protection function shortcut keys that are enabled at a time when the integrated protection function is activated. In FIG. 5C, "*1231" and "#12345#" of the registered protection function shortcut keys are registered for the integrated protection function as an example. In this case, the two protection function shortcut keys marked on the integrated protection shortcut key setting menu screen are registered for verifying the detected key input at step S410. For example, when the key input is "#12#" at step S410, the key input "#12#" is registered together with the protection function shortcut keys "*1231" and "#12345."

If the protection function setting menu is displayed, the control unit 170 recognizes personal information items selected through the input unit 150 at step S450. According to an exemplary embodiment of the present invention, one or more personal information items can be selected. When the phonebook item is selected, phone numbers can be selected to protect by name or by group. When a messages item or a communication logs item is selected, the messages and communication logs can be protected by at least one of name registered with the phonebook, message, and communication log. When one of the photos, the videos, the schedules, and the supplementary services items is selected, one of the photos, videos, schedules, and supplementary services can be individually selected to protect.

Figure 5D:
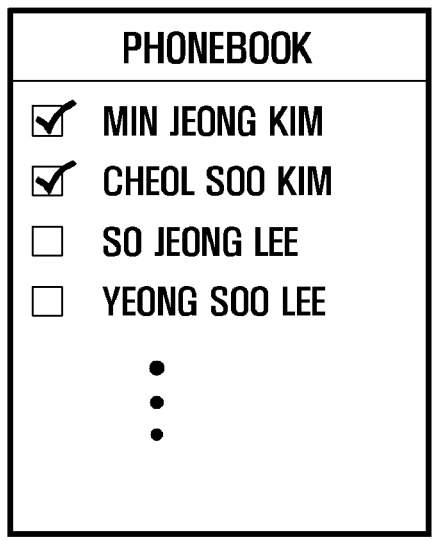
FIG. 5D is a diagram illustrating an exemplary phonebook screen displayed when a phonebook item is selected according to an exemplary embodiment of the present invention.

FIG. 5D is a diagram illustrating an exemplary phonebook screen displayed when the phonebook item is selected on the protection function setting menu. According to an exemplary embodiment of the present invention, an exemplary phone book lists names such that the information can be protected by name. In FIG. 5D, the exemplary names, Min Jeong KIM and Cheol Soo KIM, are selected. FIG. 5E is a diagram illustrating another exemplary phonebook screen displayed when the phonebook item is selected on the protection function setting menu. In this exemplary phonebook menu, the phonebook lists phone numbers by group and the groups "club" and "business" are selected to protect.

Figures 5G, 5H:
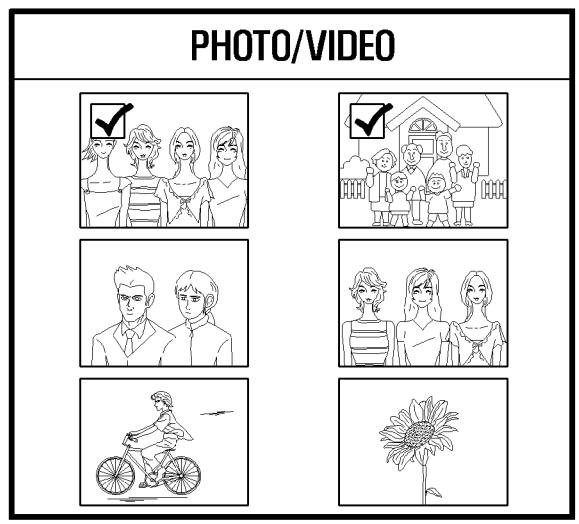
FIG. 5G is a diagram illustrating another exemplary message list screen displayed when a message item is selected according to an exemplary embodiment of the present invention.
FIG. 5H is a diagram illustrating an exemplary photo/video list screen displayed when a photo/video item is selected according to an exemplary embodiment of the present invention.

FIGS. 5F and 5G are diagrams illustrating exemplary message list screens displayed when the messages item is selected on the protection function setting menu. According to an exemplary embodiment of the present invention, the messages to be protected can be selected by name as illustrated in FIG. 5F in which Min Jeong KIM and Cheol Soo KIM are selected. According to another exemplary embodiment of the present invention, the messages can be selected individually as illustrated in FIG. 5G in which the second and fourth messages are selected.

FIG. 5H is a diagram illustrating an exemplary photo/video list screen displayed when the photo/video item is selected on the protection function setting menu. According to an exemplary embodiment of the present invention, photos and videos stored in the mobile terminal 100 can be protected individually. In the exemplary photo/video list screen of FIG. 5H, the first two photos or videos are selected for protection.

FIG. 5I is a diagram illustrating an exemplary calendar screen displayed when the schedules item is selected on the protection function setting menu. According to an exemplary embodiment of the present invention, the schedules can be protected by date. In an exemplary calendar screen of FIG. 5I, the schedules on the 15$^{th}$ and 20$^{th}$ of May, 2008 are selected for protection.

Once the items of personal information to be protected are selected at step S450, the control unit 170 enables protection on the personal information corresponding to the selected items at step S460. According to an exemplary embodiment of the present invention, the control unit 170 controls such that the personal information protected by the protection function is not displayed on the display unit 130.

If it has been determined that the detected key is enabled at step S430, the control unit 170 controls such that the display unit 130 displays a protection function option screen providing protection function enable, protection function disable, and protection function reset options, and determines whether protection function enable option, protection function disable option, or protection function reset option is selected at step S431. FIG. 5J is a diagram illustrating an exemplary protection function option screen providing protection function enable, protection function disable, and protection function reset options. If the protection function enable option is selected from the protection function option screen, the control unit 170 performs step S470 and controls not to display the personal information under the protection at step S480. Once the protection function is enabled, the personal information protected by the protection function is not displayed on the display unit 130. If the protection function disable option is selected, then the control unit 170 disables the protection on the personal information at step S432. Once the protection has been disabled, the control unit 170 controls such that the display unit 130 displays the personal information that was under the protection at step S433. If the protection function reset option is selected, then the control unit 170 controls such that the display unit 130 displays the protection function setting menu at step S440, and performs the protection function setting process.

Figure 6:
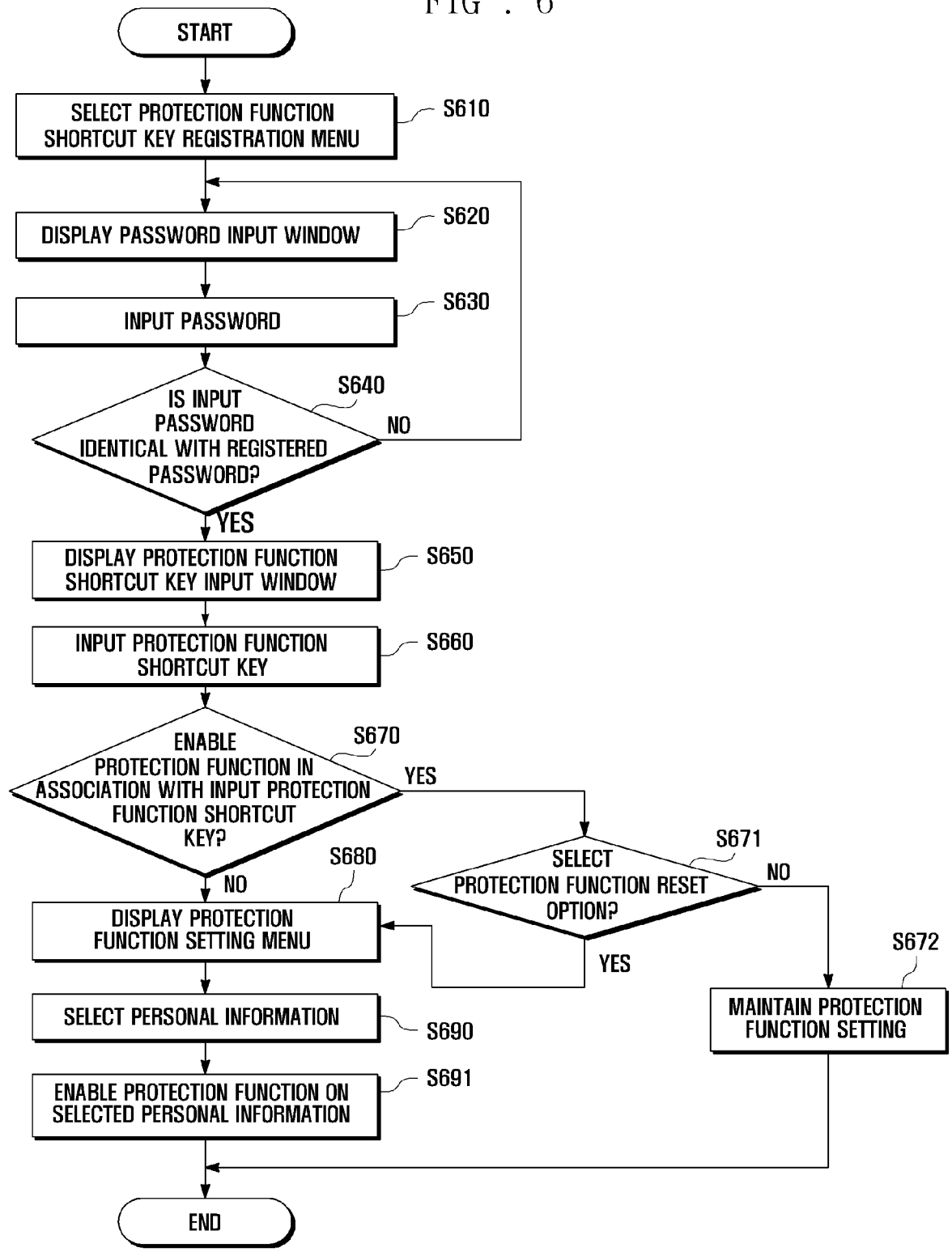
FIG. 6 is a flowchart illustrating a protection function setting procedure of a personal information protection method of a mobile terminal according to an exemplary embodiment of the present invention.

FIG. 6 is a flowchart illustrating a protection function setting procedure of a personal information protection method of a mobile terminal according to an exemplary embodiment of the present invention.

Referring to FIG. 6, when detecting the selection of the protection function shortcut key registration menu at step S610, the control unit 170 controls such that the display unit 130 displays a password input window at step S620. FIG. 3A is a diagram illustrating an exemplary setting menu screen on which a protection function shortcut key registration menu item is selected, and FIG. 3B is a diagram illustrating a protection function shortcut key registration menu screen providing an exemplary password input window. The control unit 170 checks a character string input through the password input window at step S630 and determines whether the charactering is substantially identical with the registered password at step S640. If it has been determined that the character string is substantially identical with the registered password, the control unit 170 controls such that the display unit 130 displays a protection function shortcut key input window at step S650. FIG. 3C is a diagram illustrating a protection function shortcut key registration menu screen providing an exemplary protection function shortcut key input window. Next, the control unit 170 detects a protection function shortcut key input through the protection function shortcut key input window at step S660 and determines whether the protection function shortcut key is enabled at step S670. If it has been determined that the protection function shortcut key is not enabled (disabled), the control unit 170 controls such that the display unit 130 displays a protection function setting menu screen at step S680. According to an exemplary embodiment of the present invention, the protection function setting menu includes at least one personal information item such as a phonebook, messages, communication logs, photos, videos, schedules, supplementary services, etc. The supplementary services may include a wireless Internet access, a mobile transaction service, and the like. According to an exemplary embodiment of the present invention, the protection function setting menu may further include a protection function shortcut key delete menu item and/or an integrated protection function shortcut key setting menu item for enabling all the registered protection function shortcut keys at a time. Next, the control unit 170 checks the personal information items that are selected on the protection function setting menu screen at step S690, and enables the protection functions on personal information corresponding to the selected items at step S691.

If it has been determined that the character string is not substantially identical with the registered password at step S640, the control unit 170 controls such that the display unit 130 returns to step S620 to display the password input window.

If it has been determined that the protection function shortcut key is enabled at step S670, the control unit 170 controls such that the display unit displays a protection function reset option screen asking whether to reset the protection function and determines whether the protection function reset option is selected at step S671. If it has been determined that the protection function reset option is selected, the control unit 170 controls such that the display unit 130 displays the protection function setting menu screen at step S680 and, otherwise, maintains the previous protection function settings at step S672.

Figure 7:
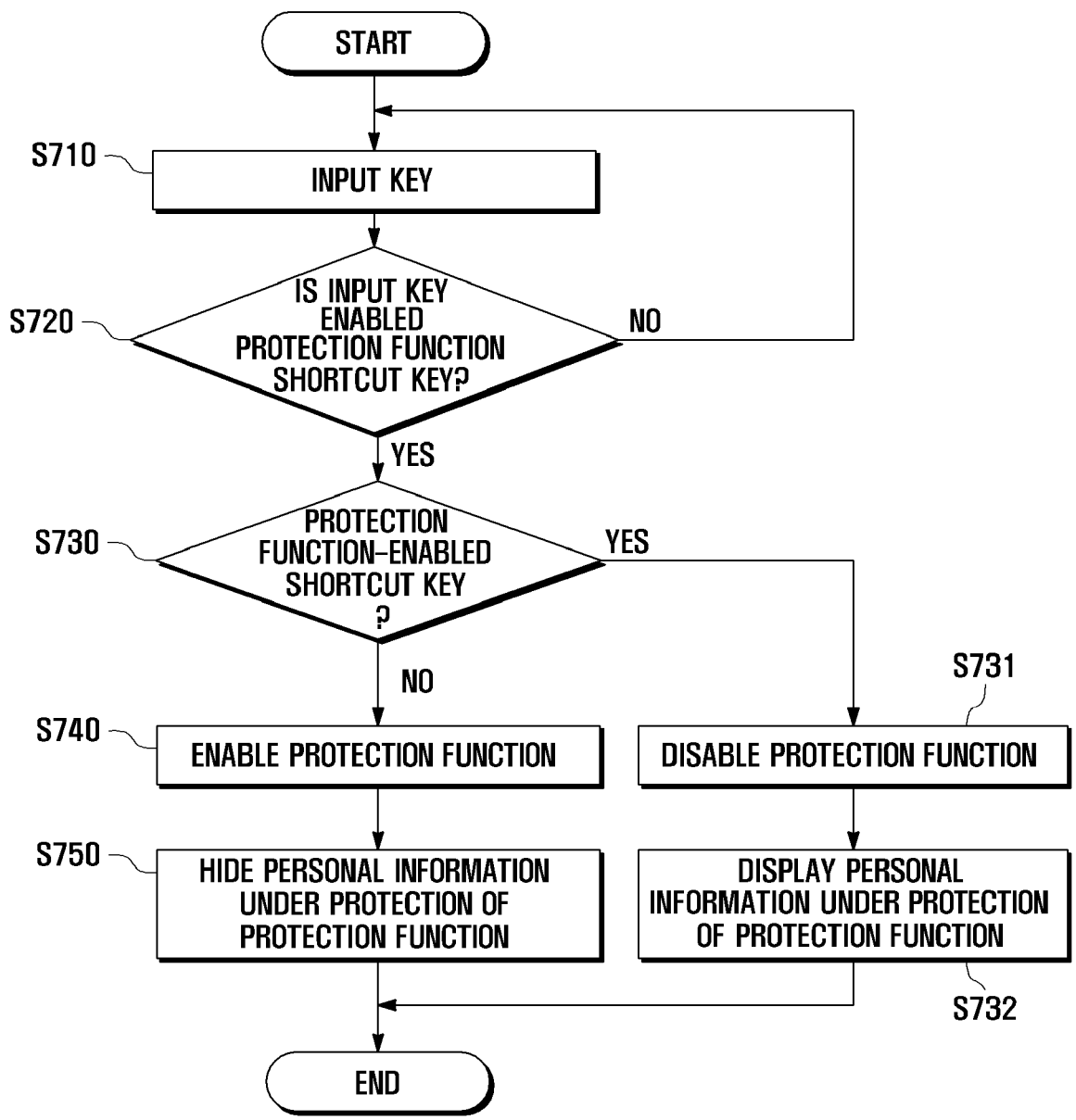
FIG. 7 is a flowchart illustrating a protection function execution procedure of a personal information protection method of a mobile terminal according to an exemplary embodiment of the present invention.

FIG. 7 is a flowchart illustrating a protection function execution procedure of a personal information protection method of a mobile terminal according to an exemplary embodiment of the present invention.

Referring to FIG. 7, if at least one key is input through the input unit 150 at step S710, then the control unit 170 detects the key input and determines whether the input key is one of registered protection function shortcut keys at step S720. If it has been detected that the input key is a registered protection function shortcut key, the control unit 170 determines whether the protection function shortcut key is enabled in association with the protection function at step S730. If it has been determined that the protection function shortcut key is disabled, the control unit 170 enables the protection function associated with the protection function shortcut key at step S740. According to an exemplary embodiment of the present invention, when the protection function is enabled, the control unit 170 controls the display unit 130 to display a protection function enable alert message. Once the protection function associated with the protection function shortcut key is enabled, the display unit 130 does not display the personal information under the protection with the protection function shortcut key at step S750. If it has been detected that the protection function shortcut key is enabled at step S730, the control unit 170 disables the protection function associated with the protection function shortcut key at step S731. According to an exemplary embodiment of the present invention, when the protection function is disabled, the control unit 170 controls the display unit 130 to display a protection function disable alert message. Once the protection function associated with the protection function shortcut key is disabled, the display unit 130 displays the personal information corresponding to the disabled protection function shortcut key at step S732. The mobile terminal owner can enable or disable the protection function by inputting the protection function shortcut key.

Figure 8A:
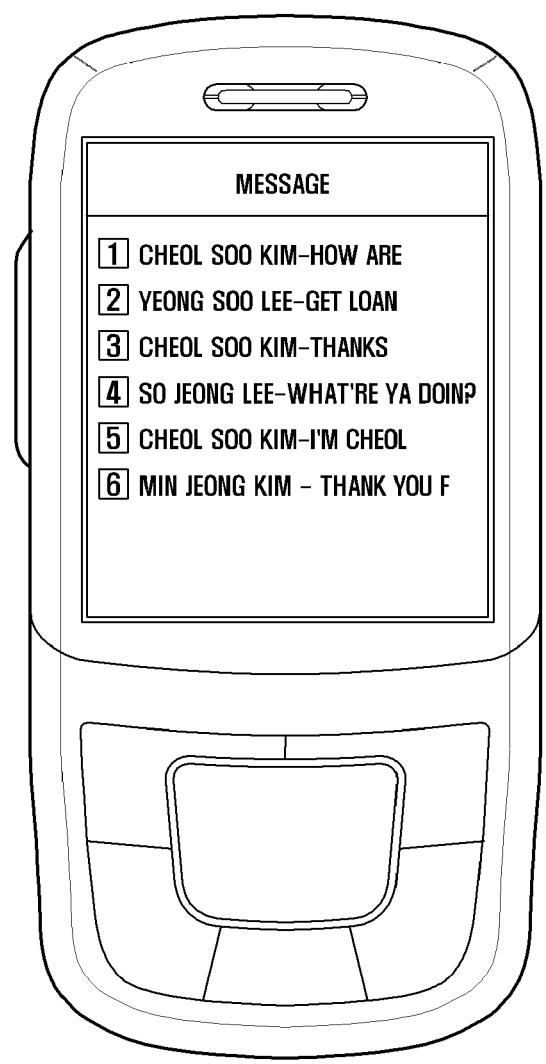
FIG. 8A is a drawing illustrating a mobile terminal according to an exemplary embodiment of the present invention when a protection function is disabled.
Figure 8B:
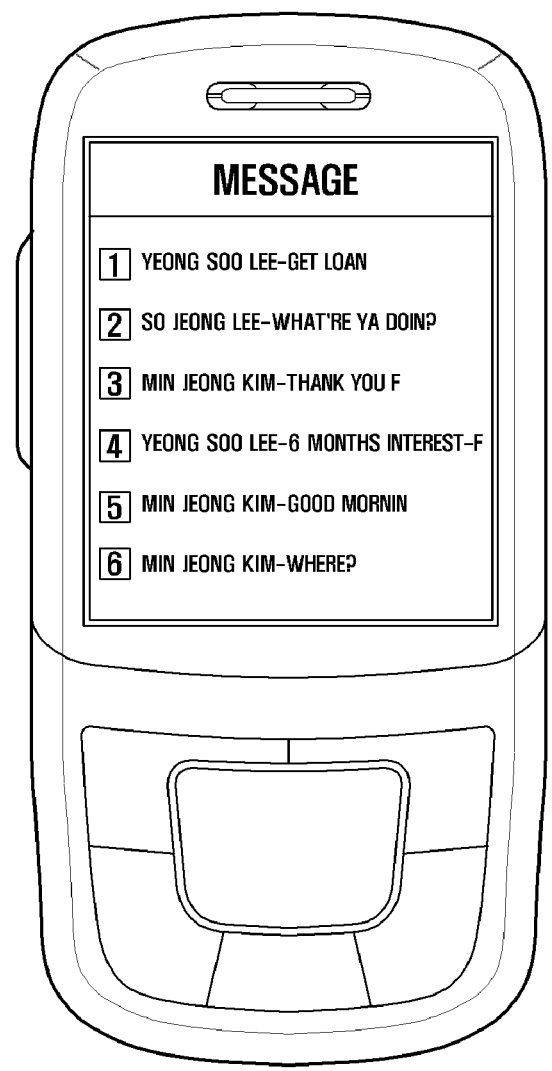
FIG. 8B is a drawing illustrating the mobile terminal of FIG. 8A when a protection function is enabled.

FIG. 8A is a drawing illustrating a mobile terminal according to an exemplary embodiment of the present invention when the protection function is disabled, and FIG. 8B is a drawing illustrating the mobile terminal of FIG. 8A when the protection function is enabled. According to an exemplary embodiment of the present invention, the display screen of the mobile terminal of which the protection function is disabled shows all messages stored in the mobile terminal. When the name "Cheol Soo KIM" is selected from the messages selected as the personal information is set to be protected with the protection function, the message items related to the name "Cheol Soo KIM" are not displayed in the message list as illustrated in FIG. 8B. If the protection function for protecting the messages associated with the name "Cheol Soo KIM" is disabled, the message items associated with the name "Cheol Soo KIM" are displayed again in the message list as illustrated in FIG. 8A.

While the invention has been shown and described with reference to certain exemplary embodiments thereof, it will be understood by those skilled in the art that various changes in form and details may be made therein without departing from the spirit and scope of the invention as defined in the appended claims and their equivalents. That is, although a touch input device operation method is described in association with a capacitive touch input device and a portable terminal using the device, the present invention is not limited thereto. For example, the methods of the present invention can be applied to any of touch input devices of which physical characteristics are changing according to the variation of external temperature.

What is claimed is:

1. A personal information protection method for a mobile terminal, method comprising:
    determining, when at least one key is input, whether the key is substantially identical with a protection function shortcut key;
    displaying, when the input key is substantially identical with a protection function shortcut key, a protection function setting menu having at least one item of personal information;
    setting, when at least one item of personal information is selected, a protection function in association with the selected personal information; and
    enabling the protection function on the selected personal information,
    wherein the personal information protected by the protection function is not displayed on a display unit of the mobile terminal, and
    wherein the protection function shortcut key corresponds to a registered combination of at least one character selected from a character set.

2. The method of claim 1, further comprising:
    registering at least one protection function shortcut key.

3. The method of claim 2, wherein the registering of at least one protection function shortcut key comprises:
    displaying, when a protection function shortcut key registration menu is selected, a protection function shortcut key input window; and
    registering, when a protection function shortcut key is input in the protection function shortcut key input window, the input protection function shortcut key.

4. The method of claim 3, wherein the registering of at least one protection function shortcut key further comprises:
    displaying a password input window before the displaying of the protection function shortcut key input window;
    determining, when a password is input in the password input window, whether the input password is substantially identical with a preregistered password; and
    displaying, when the input password is substantially identical with the preregistered password, the protection function shortcut key input window.

5. The method of claim 1, further comprising:
    determining, when the input key is substantially identical with a protection function shortcut key, whether the protection function shortcut key is enabled for the protection function; and
    displaying, when the protection function shortcut key is not enabled, the protection function setting menu.

6. The method of claim 5, further comprising:
    displaying, when the protection function shortcut key is enabled, an option screen having at least one of a protection function enable option, a protection function disable option, and a protection function reset option;
    enabling, when the protection function enable option is selected, the preset protection function;
    disabling, when the protection function disable option is selected, the present protection function; and
    displaying, when the protection function reset option is selected, the protection function setting menu.

7. A personal information protection method of a mobile terminal, the method comprising:
    determining, when at least one key is input, whether the input key is substantially identical with a protection function shortcut key associated with a protection function; and
    activating, when the input key is substantially identical with a protection function shortcut key, the protection function,
    wherein, when the protection function is activated, personal information protected by the protection function shortcut key is not displayed on a display of the mobile terminal, and
    wherein the protection function shortcut key corresponds to a registered combination of at least one character selected from a character set.

8. The method of claim 7, further comprising setting the protection function of the protection function shortcut keys.

9. The method of claim 8, wherein the setting of the protection function of the protection function shortcut keys comprises:
    displaying, when a protection function shortcut key registration menu is selected, a protection function shortcut key input window;
    displaying, when a protection function shortcut key is input in the protection function shortcut key input window, a protection function setting menu having at least one personal information item; and
    setting, when at least one personal information item is selected from the protection function setting menu, the protection function on personal information corresponding to the selected item.

10. The method of claim 9, wherein the setting of the protection function of the protection function shortcut keys further comprises:
    displaying a password input window before the displaying of the protection function shortcut key input window;
    determining, when a password is input in the password input window, whether the input password is substantially identical with a preregistered password; and
    displaying, when the input password is substantially identical with the preregistered password, the protection function shortcut key input window.

11. The method of claim 9, wherein the setting of the protection function of the protection function shortcut keys further comprises:
    determining whether the protection function shortcut key input in the protection function shortcut key input window is enabled; and
    displaying, when the protection function shortcut key is not enabled, the protection function setting menu.

12. The method of claim 11, wherein the setting of the protection function of the protection function shortcut keys further comprises:
    determining, when the protection function shortcut key is enabled, whether a protection function reset option is selected; and
    displaying, when the protection function reset option is selected, the protection function setting menu.

13. The method of claim 7, further comprising:
    determining, when the input key is substantially identical to the protection function shortcut key, whether the protection function associated with the protection function shortcut key is enabled;
    disabling, when the protection function is enabled, the protection function; and
    enabling, when the protection function is disabled, the protection function.

14. The method of claim 1, wherein the personal information comprises at least one of a phonebook, messages, communication logs, photos, videos, schedules, and supplementary services.

15. The method of claim 14, further comprising displaying, when the phonebook is selected as the personal information to be protected, a menu screen to allow selecting phone numbers by name or group.

16. The method of claim 14, further comprising:
displaying, when one of the messages and communication logs are selected as the personal information to be protected, a menu screen to allow selecting the messages and communication logs individually.

17. The method of claim 14, further comprising:
displaying, when one of the messages, communication logs, photos, videos, schedules, and supplementary services is selected, a menu screen to allow selecting at least one of messages, communication logs, photos, videos, schedules, and supplementary services.

18. The method of claim 1, wherein the protection function setting menu further comprises a protection function shortcut key delete menu item.

19. The method of claim 1, wherein the protection function shortcut keys are set with different protection functions.

20. The method of claim 19, wherein the protection function setting menu further comprises an integrated protection function shortcut setting menu for enabling all protection function shortcut keys at a time.

21. A mobile terminal supporting a personal information protection function, the terminal comprising:
- a display unit for displaying personal information stored in the mobile terminal;
- a storage unit for storing the personal information and a protection function shortcut key for executing the personal information protection function; and
- a control unit for registering the protection function shortcut key and for executing the personal information protection function,
- wherein, when the personal information protection function is activated, the personal information protected using the protection function shortcut key is not displayed on the display unit,
- wherein the protection function shortcut key corresponds to a registered combination of at least one character selected from a character set.

* * * * *